US007720152B2

(12) United States Patent
Boyce

(10) Patent No.: US 7,720,152 B2
(45) Date of Patent: May 18, 2010

(54) IMPLICIT WEIGHTING OF REFERENCE PICTURES IN A VIDEO DECODER

(75) Inventor: Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1450 days.

(21) Appl. No.: 10/529,710

(22) PCT Filed: Sep. 10, 2003

(86) PCT No.: PCT/US03/28189

§ 371 (c)(1), (2), (4) Date: Mar. 29, 2005

(87) PCT Pub. No.: WO2004/032357

PCT Pub. Date: Apr. 15, 2004

(65) Prior Publication Data

US 2006/0133486 A1   Jun. 22, 2006

Related U.S. Application Data

(60) Provisional application No. 60/415,443, filed on Oct. 1, 2002.

(51) Int. Cl.
*H04B 1/66* (2006.01)
(52) U.S. Cl. .............................. 375/240.16; 375/240.25; 375/240.26; 375/240.12; 375/240.15; 382/233; 382/238; 382/235
(58) Field of Classification Search ............ 375/240.16, 375/240.25, 240.23, 240.26, 240.12, 240.15; 382/233, 235, 238, 246
See application file for complete search history.

(56) References Cited

U.S. PATENT DOCUMENTS 4,383,272 A   5/1983   Netravali et al.

(Continued)

FOREIGN PATENT DOCUMENTS

CN   1355984   6/2002

(Continued)

OTHER PUBLICATIONS

Search Report Dated Dec. 11, 2003.

(Continued)

*Primary Examiner*—Shawn An
(74) *Attorney, Agent, or Firm*—Robert D. Shedd; Paul P. Kiel; Guy H. Eriksen

(57) ABSTRACT

A video decoder, encoder, and corresponding methods for processing video signal data for an image block with two reference picture indices to predict the image block are disclosed that utilize implicit weighting of reference pictures to enhance video compression, where a decoder includes an implicit reference picture weighting factor unit for determining a weighting factor corresponding each reference picture index; and encoder includes an implicit reference picture weighting factor assignor for assigning a weighting factor corresponding to each reference picture index; and a method for decoding includes receiving the reference picture indices with the data that corresponds to the image block, determining an implicit weighting factor responsive to the relative positioning of the image block and the reference pictures indicated by each reference picture index, retrieving a reference picture for each index, motion compensating the retrieved reference pictures, and multiplying the motion compensated reference pictures by the corresponding weight.

25 Claims, 4 Drawing Sheets

U.S. PATENT DOCUMENTS

| | | |
|---|---|---|
| 4,663,665 A | 5/1987 | Tanaka et al. |
| 4,985,768 A | 1/1991 | Sugiyama |
| 5,089,889 A * | 2/1992 | Sugiyama .............. 375/240.12 |
| 5,301,019 A | 4/1994 | Citta |
| 5,467,136 A | 11/1995 | Odaka et al. |
| 5,978,032 A | 11/1999 | Yukitake et al. |
| 6,031,575 A | 2/2000 | Suzuki et al. |
| 6,031,676 A | 2/2000 | Oenes et al. |
| 6,081,551 A * | 6/2000 | Etoh ........................... 375/240 |
| 6,097,842 A * | 8/2000 | Suzuki et al. ............... 382/232 |
| 6,275,532 B1 | 8/2001 | Hibi et al. |
| 6,414,992 B1 | 7/2002 | Sriram et al. |
| 6,680,921 B1 | 1/2004 | Svanbro et al. |
| 6,782,054 B2 | 8/2004 | Bellers |
| 7,515,637 B2 * | 4/2009 | Payson ................... 375/240.16 |
| 2002/0176503 A1 | 11/2002 | Matsunaga et al. |
| 2004/0042552 A1 | 3/2004 | Dvorkovich et al. |

FOREIGN PATENT DOCUMENTS

| | | |
|---|---|---|
| EP | 0511778 | 11/1992 |
| EP | 0645930 | 3/1995 |
| JP | 02-192378 | 7/1990 |
| JP | 2004-007379 | 1/2004 |
| RU | 2093968 | 10/1997 |
| RU | 2123769 | 12/1998 |
| RU | 2182727 | 5/2002 |
| WO | WO 97/05747 | 2/1997 |
| WO | WO 00/79762 | 12/2000 |
| WO | WO 01/86962 | 11/2001 |

OTHER PUBLICATIONS

Joint Video Team (JVT) of ISO/IEC MPEG and ITU-T VCEG, Joint Final Committee Draft (JFCD) of Joint Video Specification (ITU-T Rec. H.264 / ISO/IEC 14496-10 AVC), JVT-D157, Aug. 10, 2002, pp. 112-121.

* cited by examiner

IMPLICIT WEIGHTING OF REFERENCE PICTURES IN A VIDEO DECODER

CROSS-REFERENCE TO RELATED APPLICATIONS

This application claims the benefit, under 35 U.S.C. §365 of International Application PCT/US03/28189, filed Sep. 10, 2003, which was published in accordance with POT Article 21(2) on Apr. 15, 2004 in English and which claims the benefit of U.S. provisional patent application No. 60/415,443 filed Oct. 1, 2002.

FIELD OF THE INVENTION

The present invention relates to the field of video CODECs.

BACKGROUND OF THE INVENTION

Video data is generally processed and transferred in the form of bit streams. Typical video compression encoders and decoders ("CODECs") gain much of their compression efficiency by forming a reference picture prediction of a picture to be encoded, and encoding the difference between the current picture and the prediction. The more closely that the prediction is correlated with the current picture, the fewer bits that are needed to compress that picture, thereby increasing the efficiency of the process. Thus, it is desirable for the best possible reference picture prediction to be formed.

In some video sequences, particularly those with fades, the current picture to be coded or decoded is more strongly correlated with the reference picture scaled by a weighting factor than with the reference picture itself. Video codecs without weighting factors applied to reference pictures encode such fading sequences very inefficiently. Unfortunately, the transmission of weighting factors requires that some additional bits be sent in the bitstream.

In many video compression standards, including Moving Picture Experts Group ("MPEG")-1, MPEG-2 and MPEG-4, a motion compensated version of a previous reference picture is used as a prediction for the current picture, and only the difference between the current picture and the prediction is coded. When a single picture prediction ("P" picture) is used, the reference picture is not scaled when the motion compensated prediction is formed.

When bi-directional picture predictions ("B" pictures) are used, intermediate predictions are formed from two different pictures, and then the two intermediate predictions are averaged together, using equal weighting factors of (½, ½) for each, to form a single averaged prediction. In these MPEG standards, the two reference pictures are always one each from the forward direction and the backward direction for B pictures.

SUMMARY OF THE INVENTION

These and other drawbacks and disadvantages of the prior art are addressed by a video decoder for decoding video signal data for an image block with first and second reference picture indices to predict the image block. The decoder comprises a reference picture weighting factor unit responsive to the relative positioning between the image block and the first and second reference pictures. The reference picture weighting factor unit's output utilized for determining implicit weighting factors corresponding to each of the first and second reference picture indices, respectively.

These and other aspects, features and advantages of the present invention will become apparent from the following description of exemplary embodiments, which is to be read in connection with the accompanying drawings.

BRIEF DESCRIPTION OF THE DRAWINGS

The present invention utilizes implicit weighting of reference pictures in video coders and decoders in accordance with the following exemplary figures, in which.

DETAILED DESCRIPTION OF PREFERRED EMBODIMENTS

Figure 1:
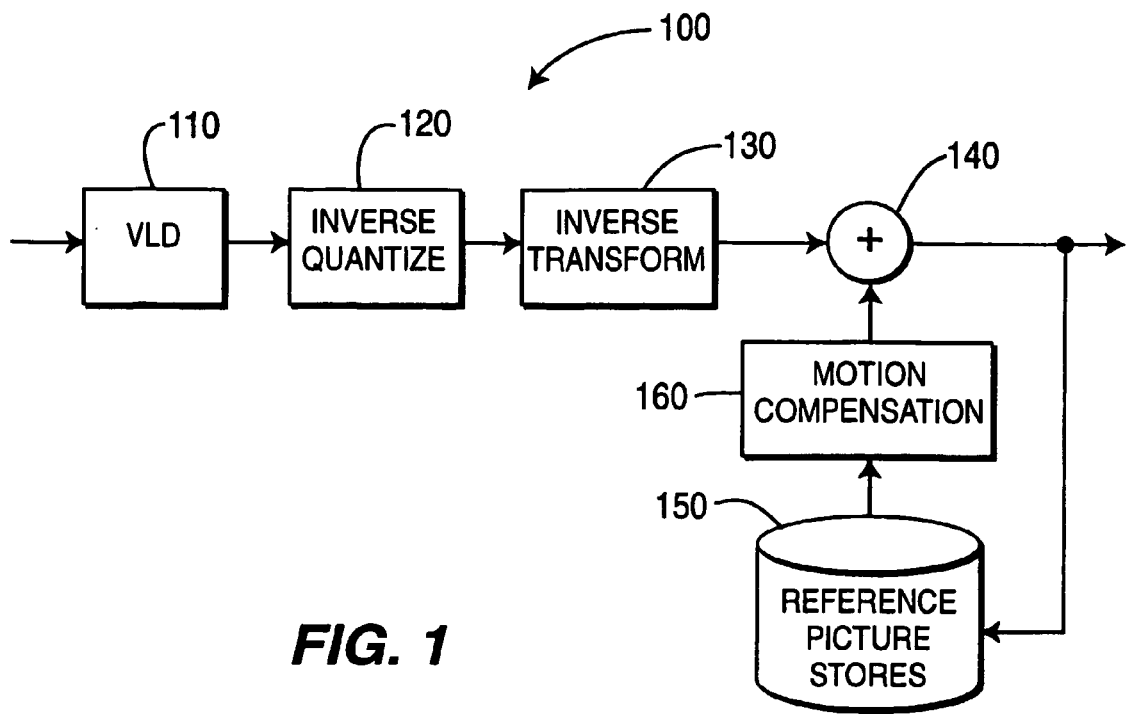
FIG. 1 shows a block diagram for a video decoder, in accordance with the principles of the present invention.

The present invention encompasses an apparatus and method for implicit weighting of reference pictures in video CODECs. In video sequences with fading, for example, the current picture or image block to be coded is more strongly correlated to a reference picture scaled by a weighting factor than to the reference picture itself. Video CODECs without weighting factors applied to reference pictures encode fading sequences very inefficiently. When weighting factors are used in encoding, a video encoder needs to determine both weighting factors and motion vectors.

In the Joint Video Team ("JVT") video compression standard, each P picture can use multiple reference pictures to form a picture's prediction, but each individual motion block or 8×8 region of a macroblock uses only a single reference picture for prediction. In addition to coding and transmitting the motion vectors, a reference picture index is transmitted for each motion block or 8×8 region, indicating which reference picture is used. A limited set of possible reference pictures is stored at both the encoder and decoder, and the number of allowable reference pictures is transmitted.

For bi-predictive pictures (also called "B" pictures), two predictors are formed for each motion block or 8×8 region, each of which can be from a separate reference picture, and the two predictors are averaged together to form a single averaged predictor. For bi-predictively coded motion blocks, the reference pictures can both be from the forward direction, both be from the backward direction, or one each from the forward and backward directions. Two lists are maintained of the available reference pictures that may used for prediction. The two reference pictures may be referred to as the list 0 and list 1 predictors, or the ref0 and ref1 reference pictures. An index for each reference picture is coded and transmitted, ref_idx_l0 and ref_idx_l1, for the list 0 and list 1 reference pictures, respectively. Joint Video Team ("JVT") bi-predictive or "B" pictures have been proposed to allow adaptive weighting between the two predictions, i.e.:

$$Pred = P1*Pred1 + P0*Pred0 + D \qquad \text{(Eqn. 1)}$$

where P1 and P0 are weighting factors, Pred0 and Pred1 are the reference picture predictions for list 0 and list 1 respectively, and D is an offset.

At least two methods for the determination and use of weighting factors have been proposed, an implicit method and an explicit method. Using the implicit method, the weighting factors are determined by the directions that are used for the reference pictures. In this method, if ref_fwd index is less than or equal to ref_bwd index, weighting factors of (½, ½) are used, otherwise weighting factors of (2, −1) are used. In the implicit mode, weighting factors of (2, −1) are always used for macroblocks coded in direct mode.

Using the explicit method, any number of weighting factors are transmitted for each slice. A weighting factor index is then transmitted for each motion block or 8×8 region of a macroblock that uses Bidirection prediction. The decoder uses the received weighting factor index to choose the appropriate weighting factor, from the transmitted set, to use when decoding the motion block or 8×8 region.

It has also been proposed to explicity transmit a weighting factor associated with each reference picture index once per slice or picture. A small but non-negligible number of bits is required to be transmitted for each slice or picture in this case.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

In embodiments of the present invention, an implicit weighting factor is applied to the reference picture prediction of a video compression encoder and decoder that uses multiple reference pictures. When a block is bipredictively coded and a new implicit mode is used as described herein, the distances of the current picture from the reference pictures are used to determine the relative weighting factors based on an interpolation/extrapolation formula.

As shown in FIG. 1, a video decoder is indicated generally by the reference numeral 100. The video decoder 100 includes a variable length decoder ("VLD") 110 connected in signal communication with an inverse quantizer 120. The inverse quantizer 120 is connected in signal communication with an inverse transformer 130. The inverse transformer 130 is connected in signal communication with a first input terminal of an adder or summing junction 140, where the output of the summing junction 140 provides the output of the video decoder 100. The output of the summing junction 140 is connected in signal communication with a reference picture store 150. The reference picture store 150 is connected in signal communication with a motion compensator 160, which is connected in signal communication with a second input terminal of the summing junction 140.

Figure 2:
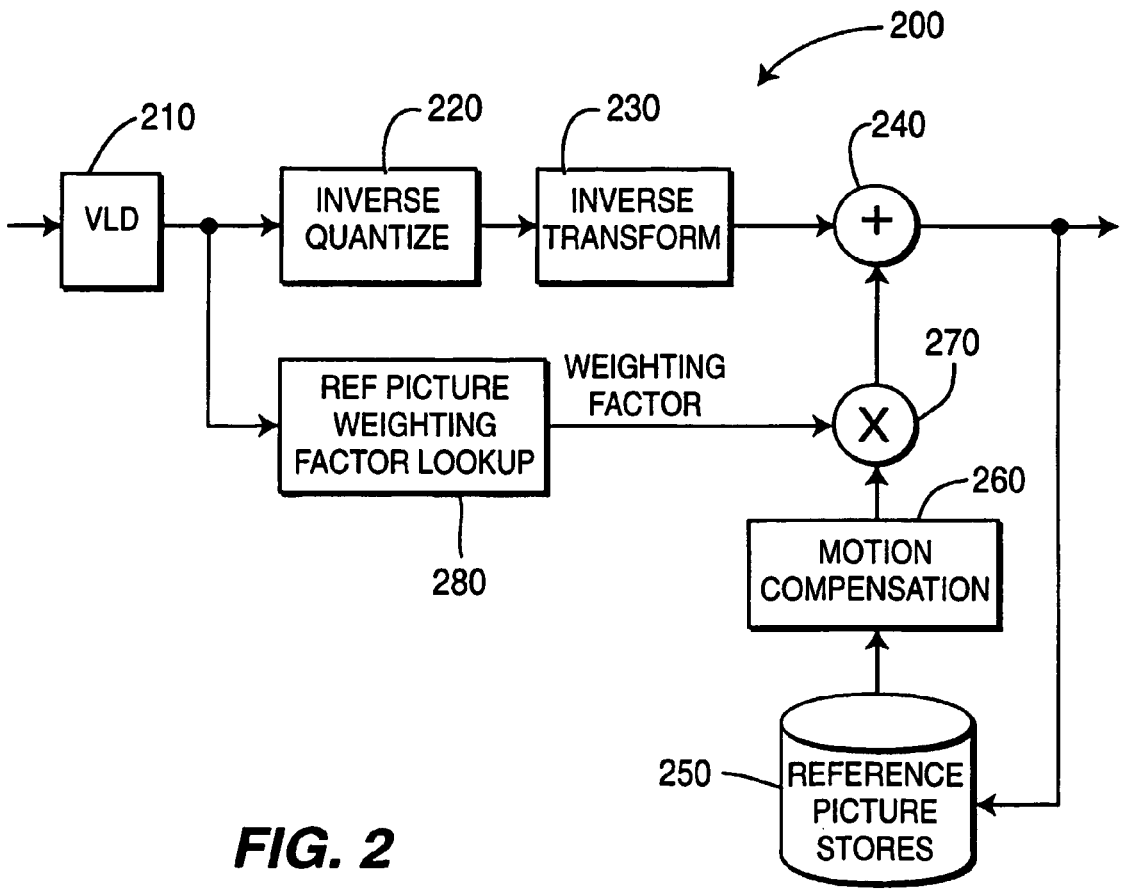
FIG. 2 shows a block diagram for a video decoder with implicit reference picture weighting, in accordance with the principles of the present invention.

Turning to FIG. 2, a video decoder with implicit reference picture weighting is indicated generally by the reference numeral 200. The video decoder 200 includes a VLD 210 connected in signal communication with an inverse quantizer 220. The inverse quantizer 220 is connected in signal communication with an inverse transformer 230. The inverse transformer 230 is connected in signal communication with a first input terminal of a summing junction 240, where the output of the summing junction 240 provides the output of the video decoder 200. The output of the summing junction 240 is connected in signal communication with a reference picture store 250. The reference picture store 250 is connected in signal communication with a motion compensator 260, which is connected in signal communication with a first input of a multiplier 270.

The VLD 210 is further connected in signal communication with a reference picture weighting factor lookup 280 for providing an implicit bi-prediction coefficient index to the lookup 280. The output of the lookup 280 is for providing a weighting factor, and is connected in signal communication to a second input of the multiplier 270. The output of the multiplier 270 is connected in signal communication with a second input terminal of the summing junction 240.

Figure 3:
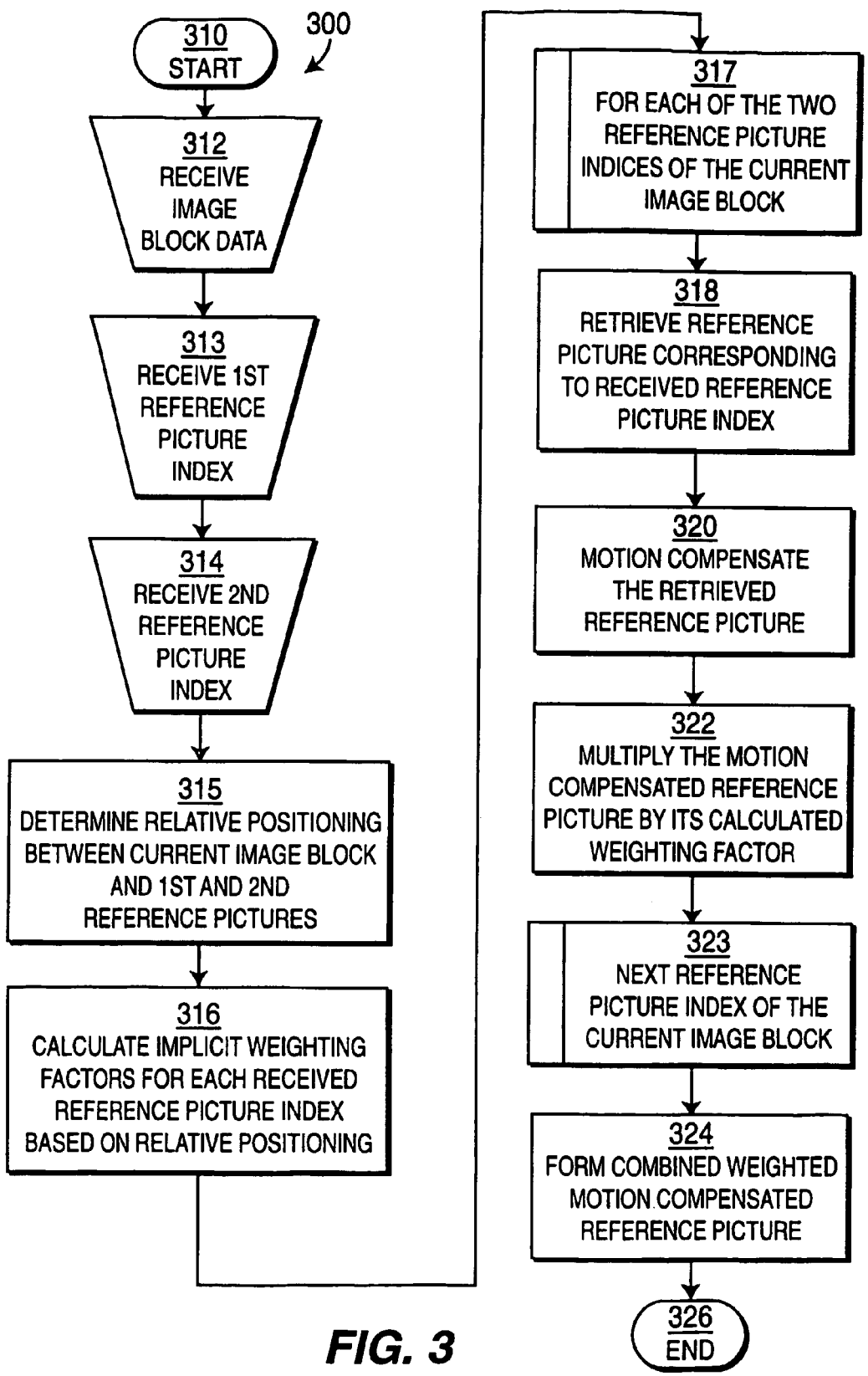
FIG. 3 shows a flowchart for a decoding process, in accordance with the principles of the present invention.

Turning now to FIG. 3, an exemplary process for decoding video signal data for an image block with implicit reference picture weighting is indicated generally by the reference numeral 300. The process includes a start block 310 that passes control to an input block 312. The input block 312 receives the image block compressed data, and passes control to an input block 313. The input block 313 receives a first reference picture index corresponding to a first particular reference picture, and passes control to an input block 314. The input block 314 receives a second reference picture index corresponding to a second particular reference picture. The input block 314 passes control to a function block 315, which determines the relative positioning between the image block and first and second reference pictures. The function block 315 passes control to a function block 316, which calculates an implicit weighting factor corresponding to each of the received reference picture indices based upon relative positioning of the current image block to the first and second reference pictures, and passes control to a function block 317.

The function block 317 begins a program loop to be executed for each of the two reference picture indices of the current image block, and passes control to a function block 318. The function block 318 retrieves a reference picture corresponding to the current loop reference picture index, and passes control to a function block 320. The function block 320, in turn, motion compensates the retrieved reference picture, and passes control to a function block 322. The function block 322 multiplies the motion compensated reference picture by the corresponding implicit weighting factor, and passes control to a function block 323. The function block 323 iterates the loop of function block 317, and passes control to function block 324 after the loop has completed twice. The function block 324, in turn, forms a combined weighted motion compensated reference picture, and passes control to an end block 326. Thus, the relative positioning determined in function block 315 is used for the determination of the weighting factors.

Figure 4:
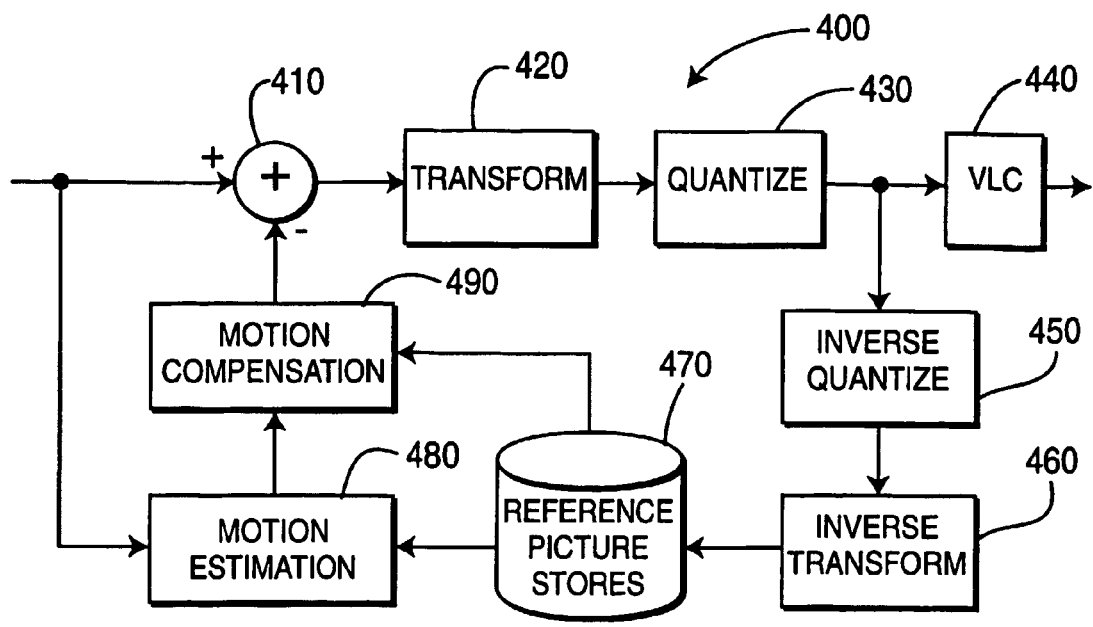
FIG. 4 shows a block diagram for a video encoder, in accordance with the principles of the present invention.

As shown in FIG. 4, a standard video encoder is indicated generally by the reference numeral 400. An input to the encoder 400 is connected in signal communication with a non-inverting input of a summing junction 410. The output of the summing junction 410 is connected in signal communication with a block transformer 420. The transformer 420 is connected in signal communication with a quantizer 430. The output of the quantizer 430 is connected in signal communication with a variable length coder ("VLC") 440, where the output of the VLC 440 is an externally available output of the encoder 400.

The output of the quantizer 430 is further connected in signal communication with an inverse quantizer 450. The inverse quantizer 450 is connected in signal communication with an inverse block transformer 460, which, in turn, is connected in signal communication with a reference picture store 470. A first output of the reference picture store 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture store 470 is connected in signal communication with a second input of the motion compensator 490. The output of the motion compensator 490 is connected in signal communication with an inverting input of the summing junction 410.

Figure 5:
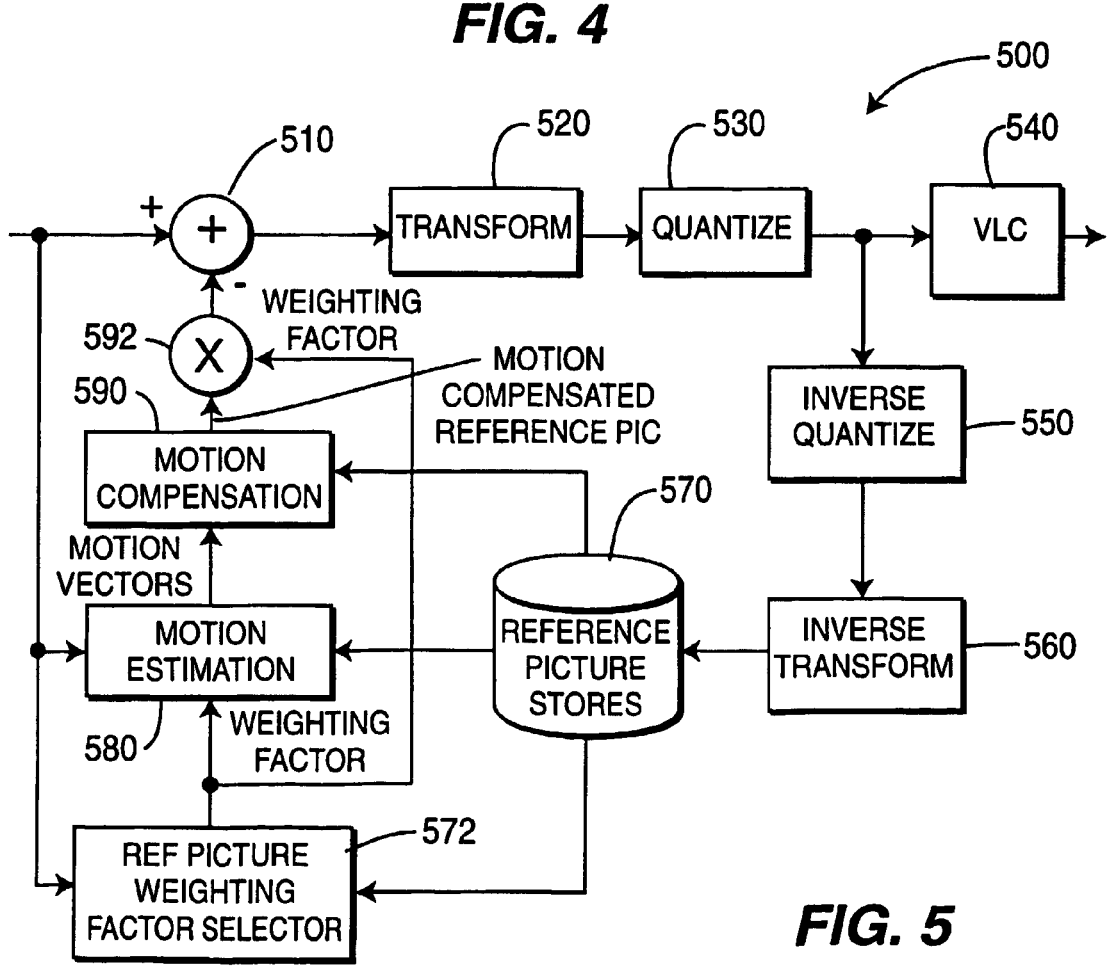
FIG. 5 shows a block diagram for a video encoder with implicit reference picture weighting, in accordance with the principles of the present invention.

Turning to FIG. 5, a video encoder with implicit reference picture weighting is indicated generally by the reference numeral 500. An input to the encoder 500 is connected in signal communication with a non-inverting input of a summing junction 510. The output of the summing junction 510 is connected in signal communication with a block transformer 520. The transformer 520 is connected in signal communication with a quantizer 530. The output of the quantizer 530 is connected in signal communication with a VLC 540, where the output of the VLC 440 is an externally available output of the encoder 500.

The output of the quantizer 530 is further connected in signal communication with an inverse quantizer 550. The inverse quantizer 550 is connected in signal communication with an inverse block transformer 560, which, in turn, is connected in signal communication with a reference picture store 570. A first output of the reference picture store 570 is connected in signal communication with a first input of a reference picture weighting factor assignor 572. The input to the encoder 500 is further connected in signal communication with a second input of the reference picture weighting factor assignor 572. The output of the reference picture weighting factor assignor 572, which is indicative of a weighting factor, is connected in signal communication with a first input of a motion estimator 580. A second output of the reference picture store 570 is connected in signal communication with a second input of the motion estimator 580.

The input to the encoder 500 is further connected in signal communication with a third input of the motion estimator 580. The output of the motion estimator 580, which is indicative of motion vectors, is connected in signal communication with a first input of a motion compensator 590. A third output of the reference picture store 570 is connected in signal communication with a second input of the motion compensator 590. The output of the motion compensator 590, which is indicative of a motion compensated reference picture, is connected in signal communication with a first input of a multiplier 592. The output of the reference picture weighting factor assignor 572, which is indicative of a weighting factor, is connected in signal communication with a second input of the multiplier 592. The output of the multiplier 592 is connected in signal communication with an inverting input of the summing junction 510.

Figure 6:
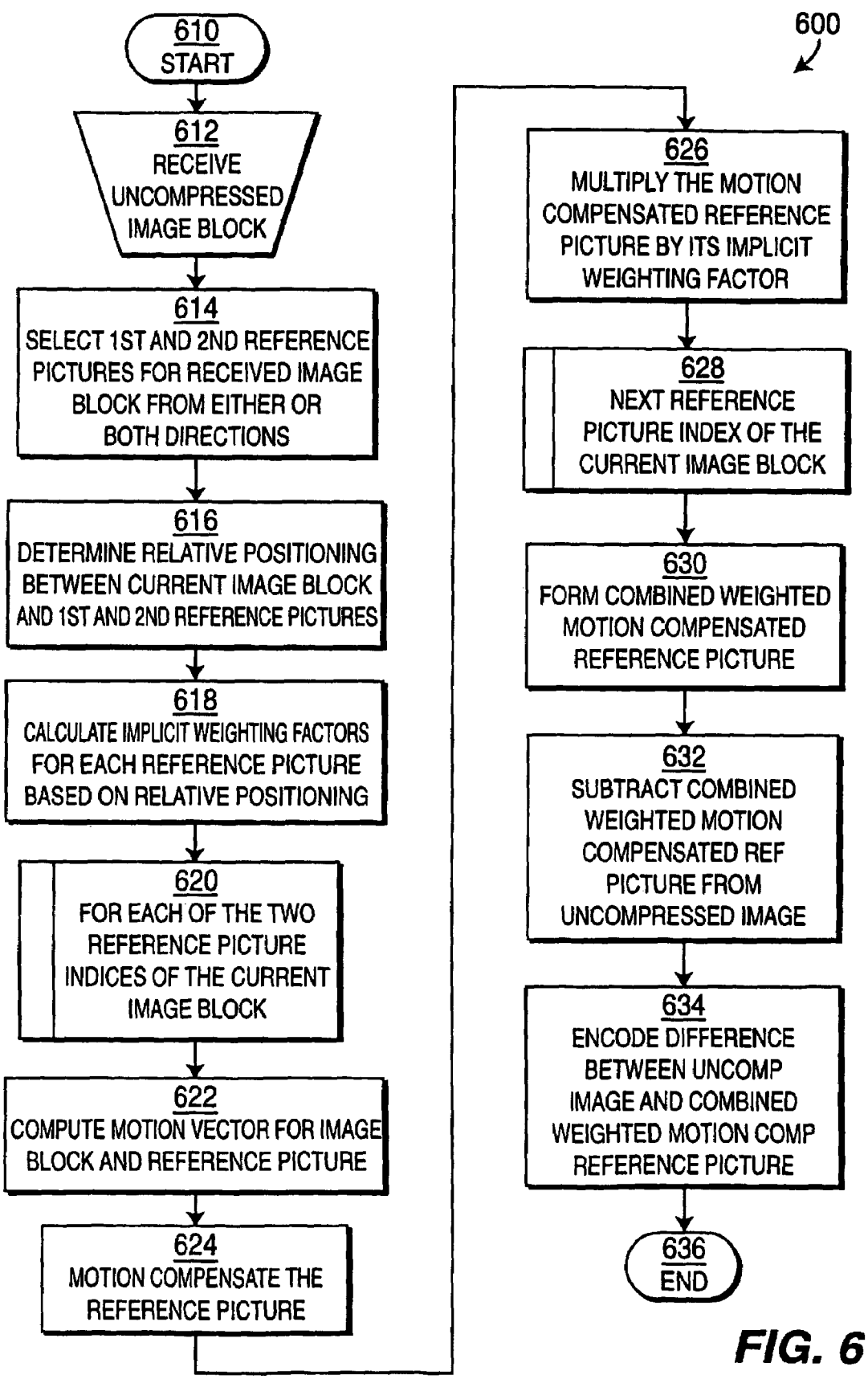
FIG. 6 shows a flowchart for an encoding process, in accordance with the principles of the present invention.

Turning now to FIG. 6, an exemplary process for encoding video signal data for an image block with implicit reference picture weighting is indicated generally by the reference numeral 600. The process includes a start block 610 that passes control to an input block 612. The input block 612 receives substantially uncompressed image block data, and passes control to a function block 614. The function block 614 selects first and second reference pictures for the received image block, from either or both directions relative to the positioning of the image block, and passes control to a function block 616. The function block 616 determines the relative positioning between the image block and the first and second reference pictures, and passes control to a function block 618. The function block 618 calculates implicit weighting factors for each particular reference picture of the image block based on the relative positioning. The function block 618 passes control to a function block 620. The function block 620 begins a program loop for each of the two reference picture indices of the current image block, and passes control to a function block 622. The function block 622 computes a motion vector for the image block and the particular reference picture, and passes control to a function block 624. The function block 624 motion compensates the particular reference picture in correspondence with the motion vector, and passes control to a function block 626. The function block 626, in turn, multiplies the motion compensated reference picture by its implicit weighting factor to form a weighted motion compensated reference picture, and passes control to a function block 628. The function block 628 iterates the loop of function block 620, and passes control to function block 630 after the loop has completed twice.

The function block 630 forms a combined weighted motion compensated reference picture, and passes control to a function block 632. The function block 632 subtracts the combined weighted motion compensated reference picture from the substantially uncompressed image block, and passes control to a function block 634. The function block 634, in turn, encodes a signal with the difference between the substantially uncompressed image block and the combined weighted motion compensated reference picture along with the corresponding index of the particular reference pictures, and passes control to an end block 636. Thus, two predictors from before, after, or around the current picture would be formed in a bi-predictive case.

In operation, an implicit weighting factor is applied to the reference picture prediction of a video compression encoder and decoder that uses multiple reference pictures. When a block is bi-predictively coded and the new implicit mode is used, the distances of the current picture from the reference picture are used to determine the relative weighting factors, based on an interpolation/extrapolation formula.

For preferred embodiments of the present invention, a new definition of implicit bi-prediction is defined. An interpolation or extrapolation formula based on the distance between the coded picture and its reference pictures is used. The same formula is used for interpolation or extrapolation. The formula becomes an interpolation formula if the two reference pictures are one before and one after the current coded picture in display order, and it becomes an extrapolation formula if the reference pictures are either both before or both after the current coded picture in display order.

The current picture is to be displayed at time T, the reference picture $P_0$, is to be displayed at time $T_0$ and the reference picture $P_1$ is to be displayed at time $T_1$. In this implicit mode, for bi-predictively coded macroblocks, the prediction is defined as $$Pred = P_0 * (T_1 - T)/(T_1 - T_0) + P_1 * (T - T_0)/(T_1 - T_0) \quad \text{(Eqn. 2)}$$

The relative display time values, T, $T_1$ and $T_0$, are present in the picture headers of relative pictures. In implicit mode, WP weighting factor determination may be based on picture order count ("POC") rather than display time. POC is present in, or derived from, the slice header. Thus, it will be understood by those of ordinary skill in the pertinent art that POC may be used in place of display time. Embodiments that store this relative position info from the reference pictures when they are decoded may also be implemented. The display times $T_1$ and $T_0$ are stored while pictures $P_1$ and $P_0$ are decoded.

When pictures are decoded their POCs or display times or positioning information is stored. When the weighting factors are to be computed, this stored positioning data is accessed, using the reference picture indices to indicate which stored position data to use. This information is stored for a direct mode motion vector scaling. The calculation of $(T_1-T)/(T_1-T_0)$ and $(T-T_0)/(T_1-T_0)$ is also used for direct mode and the result of the calculation may be saved and re-used to eliminate the need for recalculation. These division calculations can be performed for each coded picture, once for each value of T, $T_0$ and $T_1$, and that result can be scaled by a constant factor, X, to allow for more efficient shift operations rather than division operations for calculating the Pred values for each pixel. For example, if X is 256, Z0 and Z1 may be calculated once per picture as follows:

$$Z_0 = (256 * (T_1 - T))/(T_1 - T_0) \quad \text{(Eqn. 3)}$$

$$Z_1 = (256 * (T - T_0))/(T_1 - T_0) \quad \text{(Eqn. 4)}$$

Then, Pred is calculated once per pixel as:

$$Pred = (P_0 \cdot Z_0 + P_1 \cdot Z_1 + 128) >> 8 \quad \text{(Eqn. 5)}$$

Clipping of the Pred value to the desired range, typically 0 to 255, can be done after this calculation. The values of $Z_0$ and $Z_1$ may also be clipped. For chroma coefficients which are centered about 128, the following exemplary formula may be used:

$$Pred = (P_0 - 128) * (T_1 - T)/(T_1 - T_0) + (P_1 - 128) * (T - T_0)/(T_1 - T_0) + 128 \quad \text{(Eqn. 6)}$$

In a direct mode, the reference index of reference picture 0 and of reference picture 1 are not explicitly transmitted but are derived. In this case, the weighting factor is calculated based on the derived values of $T_1$ and $T_0$. The reference picture indices in the bitstream, when available, may be used to find T0 and T1.

With bi-predictively coded macroblocks in a linear fade, the proposed weighting will be ideal. In this case, a bitrate reduction may be achieved since no bits are needed to transmit the weighting factors associated with each reference picture.

For the case when P1 is two reference pictures preceding the current picture and $P_0$ is one reference picture preceding the current picture, the formula defaults to:

$$Pred = 2 * P_0 - P_1 \quad \text{(Eqn. 7)}$$

These and other features and advantages of the present invention may be readily ascertained by one of ordinary skill in the pertinent art based on the principles disclosed herein. It is to be understood that the principles of the present invention may be implemented in various forms of hardware, software, firmware, special purpose processors, or combinations thereof.

Most preferably, the present invention is implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the principles of the present invention disclosed herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A video decoder for decoding video signal data for an image block with first and second reference picture indices to predict the image block, the decoder comprising a reference picture weighting factor unit responsive to the relative positioning between the image block and first and second reference pictures, the reference picture weighting factor unit having an output for determining respective implicit weighting factors for the first and second reference pictures based on respective distances of the image block to the first and second reference pictures.

2. A video decoder as defined in claim 1 wherein the reference picture weighting factor unit comprises:
    an interpolation portion for interpolating between portions of two reference pictures disposed one before and one after the image block in display order; and
    an extrapolation portion for extrapolating from portions of two reference pictures disposed both before or both after the image block in display order.

3. A video decoder as defined in claim 1, further comprising a variable length decoder in signal communication with the reference picture weighting factor unit for providing the first and second reference picture indices to the reference picture weighting factor unit.

4. A video decoder as defined in claim 1, further comprising a motion compensator in signal communication with the reference picture weighting factor unit for providing motion compensated reference pictures responsive to the reference picture weighting factor unit.

5. A video decoder as defined in claim 4, further comprising a multiplier in signal communication with the motion compensator and the reference picture weighting factor unit for applying an implicit weighting factor to a motion compensated reference picture.

6. A video decoder as defined in claim 1 wherein the video signal data is streaming video signal data comprising block transform coefficients.

7. A video decoder as defined in claim 1, further comprising:
    prediction means for forming first and second predictors from two different reference pictures;
    combination means for combining the first and second predictors together using their corresponding implicit weighting factors to form a single combined predictor.

8. A video decoder as defined in claim 7 wherein the two different reference pictures are both from the same direction relative to the image block.

9. In a video decoder, a method for decoding video signal data for an image block, the method comprising:
    obtaining a plurality of reference picture indices for the image block, each index corresponding to a particular reference picture;
    determining implicit weighting factors responsive to the relative positioning between the image block and first and second reference pictures indicated by the plurality of reference picture indices based on respective distances of the image block to the first and second reference pictures;
    retrieving the first and second reference pictures;
    motion compensating the retrieved reference pictures; and
    multiplying the motion compensated reference pictures by their corresponding implicit weighting factors, respectively, to form corresponding weighted motion compensated reference pictures.

10. A method as defined in claim 9 wherein obtaining a plurality of reference picture indices for the image block comprises receiving the plurality of reference picture indices with the data for the image block in an implicit mode.

11. A method as defined in claim 9 wherein obtaining a plurality of reference picture indices for the image block comprises deriving the plurality of reference picture indices from the data for the image block in a direct mode.

12. A method as defined in claim 9 wherein motion compensating the retrieved reference pictures comprises determination of motion vectors for the retrieved reference pictures relative to the image block.

13. A method as defined in claim 9 wherein determining implicit weighting factors comprises:
    receiving a slice header field for the image block;
    determining a picture order count from the slice header field;
    using the picture order count to determine the relative positioning of the image block and the plurality of reference pictures.

14. A method as defined in claim 9 wherein the relative positioning of the image block and the plurality of reference pictures corresponds to the relative display times of the respective pictures.

15. A method as defined in claim 9 wherein determining an implicit weighting factor comprises at least one of:
    interpolating between portions of two reference pictures disposed one before and one after the image block in display order; and
    extrapolating from portions of two reference pictures disposed both before or both after the image block in display order.

16. A method as defined in claim 9, further comprising:
    combining the weighted motion compensated reference pictures to form a combined weighted motion compensated reference picture.

17. A method as defined in claim 9, further comprising adding the combined weighted motion compensated reference picture to the data for the image block to predict the image block.

18. A method as defined in claim 17, further comprising storing the predicted image block as a reference picture for future retrieval.

19. A method as defined in claim 9 wherein the video signal data is streaming video signal data comprising block transform coefficients.

20. A method as defined in claim 9, further comprising:
    forming first and second predictors from two different reference pictures;
    motion compensating each of the first and second predictors;
    combining the first and second predictors together using their corresponding implicit weighting factors to form a single combined predictor.

21. A method as defined in claim 20 wherein the two different reference pictures are both from the same direction relative to the image block.

22. A method as defined in claim 9 wherein determining implicit weighting factors comprises pre-computing at least one weighting factor and storing said at least one weighting factor for re-use.

23. A method as defined in claim 9, further comprising:
    storing the relative positioning information of the image block and the plurality of reference pictures; and accessing the stored relative positioning information to compute the implicit weighting factors by using the reference picture indices to indicate which stored positioning data to use.

24. A method as defined in claim 23, further comprising:
reusing the relative positioning information in direct mode to eliminate the need for recalculation.

25. A method as defined in claim 23, further comprising:
performing division calculations for each coded picture and for each value of position and scaling that result by a constant factor to allow for more efficient shift operations rather than division operations for calculating the prediction values for each pixel.

* * * * *